United States Patent Office 3,235,385
Patented Feb. 15, 1966

3,235,385
COMPOSITION FOR USE IN THE PREPARATION OF FRIED FOODSTUFFS
John G. Cull, 2101 Webster St., San Angelo, Tex.
No Drawing. Filed July 12, 1963, Ser. No. 294,754
4 Claims. (Cl. 99—1)

This invention relates to an improved dipping mix and more particularly to a composition which is applied as a coating during the preparation of fried foodstuffs.

Heretofore it has been the general practice to employ eggs and milk, either sweet, skim, evaporated or buttermilk, in any desired combination, to produce a batter in which various foodstuffs are immersed prior to cooking or frying. The batter or dip thus produced becomes dark if the item being fried requires over fifteen minutes to cook at a temperature of 350° Fahrenheit. On the other hand, a smaller item, requiring a cooking time of only 3 to 5 minutes, may have a very light colored crust. Furthermore, most batters thus formed will not brown in fresh cooking oil at a temperature below 400° Fahrenheit; this temperature, however, is sufficiently high to cause the break down of the cooking oil.

The subject invention relates to a dry mixture which is to be dissolved in water to produce a dipping solutions which retains flour or meal placed on chicken, steaks, onion rings and other foodstuffs which preferably are to be battered or breaded prior to cooking. A crisp, tender, flaky crust of a golden brown color is thus produced.

Accordingly it is the primary object of the present invention to provide a dry mixture which only requires the addition of water to produce a dipping solution.

Another object of this invention is to provide a dipping solution which when used with flour or meal produces a tender, crisp coating on fried foodstuffs.

A further object of the invention is to provide a dipping solution which with flour or meal produces a golden brown crust that remains crisp for sixty to ninety minutes after cooking.

Still another object is the provision of a batter which produces a golden brown crust in only four minutes at temperatures as low as 320° Fahrenheit.

Another object of the invention is to provide a batter which will produce a golden brown crust with no burning or charring at temperatures up to 440° Fahrenheit.

A still further object of the invention is to provide a batter which adheres to the foodstuffs and does not pull away therefrom during breading or deep-frying.

A final object of the present invention is to provide such a dipping mix which is inexpensive, easy to use, does not require refrigeration in powdered form and may conveniently be used on every type of foodstuff customarily utilizing a batter and/or breading.

Other objects and features of the invention will become apparent to those skilled in the art as the disclosure is made in the following detailed description of preferred embodiments of the invention. It is to be understood, of course, that while the proportions of the ingredients suggested in the examples are of particular utility, important advantages inherent in the invention may be obtained by using the ingredients in other proportions. The invention is therefore not to be construed as limited to the precise ingredients or to the exact proportions illustrated and described, but within the scope of the appended claims, may vary within wide ranges.

EXAMPLE I

| | Percent by weight |
|---|---|
| Sodium chloride | 44.5 |
| Sodium bicarbonate | 22.2 |
| Dried buttermilk | 18.5 |
| Pregelatinized cornstarch | 7.4 |
| Tetrasodium pyrophosphate | 7.4 |

The dry ingredients that make up the dipping mix are combined and thoroughly mixed. The dried buttermilk may be replaced, if desired, by dried skim milk, powdered whey, whole dried milk or any desired combination of dried skim, buttermilk, whole milk and powdered whey to yield the recommended percentage by weight of such ingredient. Substitution of powdered whey for the dried buttermilk in the formulation results in a faster rate of browning; no burning or charring was observed after 18 minutes at 375° Fahrenheit.

The pregelatinized cornstarch may be varied within the range of 6 to 9 percent; when more than 9 percent of such ingredient is utilized the breading materials tend to pull away from the foodstuffs. A cold water stabilizer such as algin, carrageen, gum arabic or the like may advantageously be substutited for the pregelatinized cornstarch. The tetrasodium pyrophosphate may be replaced by another sodium phosphate, mono calcium phosphate or by citric or tartaric acid.

EXAMPLE II

| | Percent by weight |
|---|---|
| Sodium chloride | 48.2 |
| Sodium bicarbonate | 22.2 |
| Dried skim milk, buttermilk, whole milk or powdered whey | 18.5 |
| Pregelatinized cornstarch | 7.4 |
| Monocalcium phosphate | 3.7 |

In the preferred embodiment of the invention 54 grams of the dry dipping mixture of Examples I or II is added to 32 ounces of water, at room temperature, and dissolved. The foodstuffs are covered with such aqueous solution as by dipping, spraying or cascading. The foodstuffs may then be rolled in flour or meal and cooked by any conventional frying method. Table I lists representative foodstuffs which were battered utilizing the dipping mixture of Example I dissolved in water. Information relating to the temperature of the deep-fry, cooking time and texture of the coating is presented.

*Table I*

| Food | Temperature (° F.) | Time (Min.) | Color |
|---|---|---|---|
| Onion rings | 320–330 | 3 | Golden brown. |
| Chicken thighs | 300 | 15 | Do. |
| Do | 325 | 15 | Do. |
| Do | 390 | 12 | Do. |
| Do | 430 | 12 | Do. |
| Steak fingers | 365 | 3–5 | Do. |
| Chicken wings | 320 | 10 | Do. |

To investigate the stability of the crispiness and flaky tenderness of the foodstuffs heretofore tested, each of the foodstuffs listed in Table I were placed on an absorbent paper, at room temperature, and observed at twenty minute intervals for a period of two hours. The results of such observations are listed in Table II.

Table II

| Food | 20 min. | 40 min. | 60 min. | 90 min. | 120 min. |
|---|---|---|---|---|---|
| Onion rings | Crisp and tender. | Crisp and tender. | Crisp and tender. | Crisp and tender. | Lost crispiness. |
| Chicken thighs | do | do | do | Lost crispiness. | Poor. |
| Do | do | do | do | do | Do. |
| Steak fingers | do | do | do | do | Do. |
| Chicken wings | do | do | do | Crisp and tender. | Do. |

Various modifications are contemplated and may obviously be resorted to by those skilled in the art without departing from the spirit and scope of the invention, as hereinafter defined by the appended claims, as only prefered embodiments thereof have been disclosed.

What is claimed is:

1. A composition for use in the preparation of fried foodstuffs comprising sodium chloride 44.5%, sodium bicarbonate 22.2%, dried buttermilk 18.5%, pregelatinized cornstarch 7.4% and tetrasodium pyrophosphate 7.4%.

2. A composition for preventing the dehydration of foodstuffs during the frying thereof consisting of the following in substantially the percentage set forth

| | |
|---|---|
| Sodium chloride | 48.2 |
| Sodium bicarbonate | 22.2 |
| Dried skim, buttermilk, whole milk and whey | 18.5 |
| Pregelatinized cornstarch | 7.4 |
| Monocalcium phosphate | 3.7 |

3. The composition of claim 1 in which said composition is dissolved in water.

4. The composition of claim 1 in which 54 grams of said composition is added to 32 ounces of water.

References Cited by the Examiner

UNITED STATES PATENTS

| | | | |
|---|---|---|---|
| 2,000,888 | 5/1935 | Fiske et al. | 99—94 |
| 2,401,259 | 5/1946 | Lloyd et al. | 99—94 |
| 2,623,825 | 12/1952 | Tressler et al. | 99—83 |
| 3,041,178 | 6/1962 | Marvin et al. | 99—1 |
| 3,052,545 | 9/1962 | Ducharme et al. | 99—83 |

A. LOUIS MONACELL, *Primary Examiner.*

RAYMOND N. JONES, *Examiner.*